(12) United States Patent
Währisch (10) Patent No.: US 10,746,238 B2
(45) Date of Patent: Aug. 18, 2020

(54) CENTRIFUGAL POSITIVE BLOCKING BRAKE FOR SHUTTER DRIVES AND SHUTTER DRIVES USING THE SAME

(71) Applicant: Johnson Electric International AG, Murten (CH)

(72) Inventor: Sten Währisch, Dresden (DE)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 111 days.

(21) Appl. No.: 16/191,212

(22) Filed: Nov. 14, 2018

(65) Prior Publication Data
US 2019/0145472 A1 May 16, 2019

(30) Foreign Application Priority Data
Nov. 15, 2017 (DE) .......................... 10 2017 126 807

(51) Int. Cl.
*F16D 63/00* (2006.01)
*F16D 59/00* (2006.01)
(Continued)

(52) U.S. Cl.
CPC .............. *F16D 63/006* (2013.01); *E06B 9/72* (2013.01); *E06B 9/90* (2013.01); *F16D 51/18* (2013.01);
(Continued)

(58) Field of Classification Search
USPC .......................... 188/135, 185, 186; 160/313
See application file for complete search history.

(56) References Cited

U.S. PATENT DOCUMENTS 3,971,462 A * 7/1976 Johansson ............... F16D 43/18
  192/105 BA
4,662,423 A * 5/1987 Ishii ......................... E06B 9/90
  160/293.1

(Continued)

*Primary Examiner* — Robert A. Siconolfi
*Assistant Examiner* — San M Aung
(74) *Attorney, Agent, or Firm* — Millman IP Inc.

(57) ABSTRACT

The invention concerns a centrifugal positive blocking brake for shutter drives. The brake includes centrifugal blocks, central spring element, and a drive motor comprising a drive shaft. A turntable is coupled with the drive shaft. The central spring element having a preloaded spring is centrifugally guided in a recess of the turntable. Either side of the spring is connected with a radially movable engaging tab element. Two different radially acting abutments are disposed on the central spring element and are movable towards recess. The engaging tab element has at least one engaging tab pointing radially inwards. The centrifugal block is attached to the engaging tab element. In the de-energized state of the drive motor, the engaging tab elements together with the centrifugal blocks disposed on them engage into detents of a frame-fixed detent disc with at least one engaging tab in a frictionally and positively locking manner. When voltage is applied and the drive motor starts, the engaging tabs disengage, the individual centres of mass of the central spring element, preloaded spring, the engaging tab element, the engaging tab, and two centrifugal block parts are on one symmetry axis. This invention creates a centrifugal positive blocking brake which is small in size and constructively simple and causes locking of the shutter when de-energized.

15 Claims, 5 Drawing Sheets

(51) Int. Cl.
*F16D 51/18* (2006.01)
*H02K 7/102* (2006.01)
*E06B 9/72* (2006.01)
*E06B 9/90* (2006.01)
*H02K 11/21* (2016.01)
*E06B 9/80* (2006.01)

(52) U.S. Cl.
CPC ............ *F16D 59/00* (2013.01); *H02K 7/102* (2013.01); *E06B 2009/807* (2013.01); *H02K 11/21* (2016.01)

(56) References Cited

U.S. PATENT DOCUMENTS

| | | | | |
|---|---|---|---|---|
| 7,140,475 | B1* | 11/2006 | Appelqvist | F16D 49/16 188/186 |
| 2002/0170786 | A1* | 11/2002 | Bucher | H02K 7/102 188/185 |
| 2014/0332172 | A1* | 11/2014 | Hsieh | E06B 9/84 160/133 |
| 2016/0319598 | A1* | 11/2016 | Waehrisch | F16D 59/00 |

* cited by examiner

CENTRIFUGAL POSITIVE BLOCKING BRAKE FOR SHUTTER DRIVES AND SHUTTER DRIVES USING THE SAME

CROSS REFERENCE TO RELATED APPLICATION

This application claims the benefit of German Patent Application Serial No. 10 2017 126 807.3 having a filing date of Nov. 15, 2017. The entire content of the aforementioned is hereby incorporated by reference for all purposes.

FIELD OF THE INVENTION

The invention relates to a centrifugal positive blocking brake for shutter drives which, when at rest, generates a sufficient braking and holding torque on the drive, locks the shutter.

BACKGROUND OF THE INVENTION

In principle, a great variety of different individual technical solutions are known as active or also as passive braking systems for shutter drives. Shutter drives with active electromagnetic or electromechanical brakes consume additional energy and generate considerable switching noise when actuated. Furthermore, they also need a relatively large mounting space as can be seen, e.g. from EP 000 0002 234 245 and DE 20 2005 007 921. The advantage of passively acting braking systems is that they need no auxiliary energy and occupy a smaller mounting space.

DE 10 2005 047 296 B3 describes a centrifugal brake having a brake drum that surrounds the rotating element at least partially and at least one centrifugal block which is disposed on the rotating element and is substantially radially movable between the rotating element and an inner wall of the brake drum. An additional braking device is provided for actuation when the rotating element exceeds a predefined speed. This makes it possible to bring the rotating element rapidly to a standstill. Generally, such brakes are not used for stopping a rotational speed strongly or even rigidly, but only for limiting it. From a defined rotational speed, the centrifugal blocks start moving radially outwards from their rest position as a result of the centrifugal force acting on them. When a defined actuating speed is reached, the centrifugal blocks come in contact with the brake drum so that friction and, related to this, a braking effect occurs. In specific application cases the brake drums are also used to stop the rotating element.

From U.S. Pat. No. 4,216,848 a braking device for a rod-like element is known, where centrifugal blocks can be brought in contact with a so-called brake shoe to cause it to rotate and move axially towards the rod. During this, a brake wheel is pushed against a brake disc, finally braking the rod-like element.

DE 10 2015 106 833 A1 describes a centrifugal brake for shutter drives, having two spring elements which apply a holding force in addition to a braking force. This centrifugal brake is coupled to a drive shaft of the shutter drive and is actuated by the shutter drive motor. It is constructed to act inversely, i.e. not braking as known, but locking and decoupling on start-up. It has a turntable coupled with the shutter drive shaft via a shaft flange. Two or more centrifugal blocks are disposed and slidably guided in the turntable. When the shutter drive is in a de-energized state, the centrifugal blocks with their partially overarching brake blocks engage, frictionally or positively locking, with the surface of a friction ring that is fixedly disposed at the motor housing frame. When the drive motor starts, the brake blocks are released, i.e. disengaged. The radial distance of the brake blocks is maintained until the current is switched off and the drive motor 11 comes to a standstill. Then the centrifugal blocks with the angled brake blocks are radially pulled inside, acting as a reliable lock. The spring elements are dimensioned such that the brake blocks provide a sufficient holding torque. However, problems of wear may occur when they are frequently actuated.

Furthermore, DE 93 13 666.8 U1 describes a braking device for an electric motor, in particular a tubular electric motor provided with a purely mechanical brake with at least one brake pad, brake blocks and elastic means. When the brake is at rest, the brake blocks are pushed against a brake pad, using spring force. The brake is provided with flyweights which move the elastic means out of their braking position under the influence of the centrifugal force. At rest (de-energized), this brake is active, and when the electric motor starts, the brake is released by the action of centrifugal force. The brake blocks are specifically configured in the form of crown segments which are hinged at one end to a brake block carrier. The elastic means used are arc-shaped springs. This braking device as a frictional blocking brake is constructively relatively long in the axial direction and therefore requires considerable mounting space.

SUMMARY OF THE INVENTION

In general, the following technical solutions applies to all literature listed above.

The object of the invention is to create a novel, simplified centrifugal positive blocking brake for shutter drives, which is extremely small in size and constructively very simple, causes permanent, fast locking of the shutter when the drive is de-energized, releases the positive blocking brake very fast when the drive is energized, operates passively without any additional auxiliary energy to be provided, generates little or no disturbing noise during operation and is designed to be low-wear.

The object is achieved by the characteristics of the first patent claim, according to the invention. Further purposeful configurations of the invention are the object of the further dependent claims. The novel centrifugal positive blocking brake for a shutter drive, comprising centrifugal blocks, at least one spring, a drive motor disposed in a tubular housing, and a drive shaft, is constructed according to the known working principle to act inversely, that means, not merely braking, but locking and decoupling on start-up. According to the invention, a turntable is coupled with the drive shaft of the drive motor and a groove-like recess is formed in the turntable. A central spring element with a preloaded spring disposed inside is centrifugally guided in this groove-like recess of the turntable. The central spring element consists of the spring and two embracing spring forks, in which the spring is fastened. These spring forks with the centrically disposed spring are supported and guided radially movably in the groove-like recess. Radially outwards, the spring forks are preferably wedge-shaped and a wedge surface. The wedge surface serve as an abutment, acting as a radial centring stop in connection with equally wedge-shaped surfaces formed in the turntable towards the outer edge. Theses surfaces run towards each other to cause self-centring and fixing. An abutment formed in axial direction of the spring forks serves as an end abutment, also limiting the outward radial movement of all radially movable parts during operation of the drive motor. At the same time, it serves as a further positioning aid. The centrifugal forces acting outwardly during motor operation cause fixing as well as accurate positioning so that no vibrations of radially movable parts can occur. This avoids unwanted noise. Coupled to the spring forks on either side, i.e. to the spring ends of spring, is a radially movable engaging tab element, with these engaging tab elements being guided in the outer area in a groove-like narrower recess of the turntable. If needed, the spring forks may also be integrally formed with engaging tab elements.

The engaging tab element has at least one engaging tab pointing radially inwards. For example, with two engaging tabs per engaging tab element, these are symmetrically distributed. A centrifugal block is fastened to each of the engaging tab elements and may be configured as a one-piece centrifugal block or as consisting of two centrifugal block parts. The centrifugal blocks and the connected engaging tab element can also be configured as a single component. In the de-energized state of the drive motor, the engaging tab elements together with the centrifugal blocks fixedly disposed on them engage into the detents of a frame-fixed detent disc with a least one engaging tab in a frictionally and positively locking manner. When starting, the drive motor causes a radial movement of all movable parts towards the frame-fixed detent disc. The engaging tabs slide on the surface of the curved detents and are pushed outwards. At the same time, the centrifugal force causes a far stronger radial movement and the engaging tab elements move so far outwards that they become disengaged. Then the drive motor can move the shutter. The radial distance of the engaging tab elements with the engaging tabs is maintained until the current is switched off and the drive motor comes to a standstill. Then the two engaging tab elements with the centrifugal blocks coupled to them are immediately pulled radially inwards by the appropriately preloaded spring, the engaging tabs engage in a detent and the engagement is reliably locked. The spring is dimensioned such that the engaging tabs cause a sufficient holding torque, primarily in a positively locking manner, but additionally also by friction.

In particular, the number of detents is identical or they are an integer multiple of the detent positions of the drive motor. This is required to avoid unnecessary noise and each engaging tab can always engage into exactly one detent. If the engaging tabs are disengaged when voltage is applied and the drive motor starts, all movable parts must be able to move freely within tight tolerance limits and without friction. For this effect to occur in this perfectly coordinated centrifugal positive blocking braking system without impairment and unnecessary wear over a prolonged period, the individual centres of mass of all radially movable parts (such as central spring element, spring, engaging tab element, engaging tab and centrifugal blocks or centrifugal block parts) are provided to be on one symmetry axis. This centrifugal positive blocking brake is designed to be extremely small in size, constructively very simple and low-noise and is characterized by a long service life. When the drive motor is de-energized, it ensures a permanent, fast locking of the shutter and causes the centrifugal positive blocking brake to release fast when the drive is energized. It operates reliably in a passive manner and even without requiring any auxiliary energy to be additionally provided, while offering minimized power consumption of the drive motor.

In a preferred embodiment of the centrifugal positive blocking brake for shutter drives, only one engaging tab is formed per engaging tab element. This allows a very fast start, reducing the minimum motor power of the shutter drive motor to be employed.

In such centrifugal positive blocking brakes for shutter drives, it is advantageous to dispose the one engaging tab per engaging tab element in precise centrical alignment with the symmetry axis with respect to the spring on the engaging tab element.

In the centrifugal positive blocking brake for shutter drives, the transitions between the individual detents of the detent disc are tangentially sinusoidal.

Particularly good centring and thus a very low-noise embodiment of the centrifugal positive blocking brake for shutter drives can be achieved if the abutment is wedge-shaped or cone-shaped as a three-point abutment in the turntable.

In order to bring about a very fast and low-noise start of the centrifugal positive blocking brake during shutter operation, it is particularly advantageous if the radius of each engaging tab has a ratio from $4/5$ to $2/3$ of the radius of the individual detents incorporated in the outer edge of the detent disc.

DETAILED DESCRIPTION OF VARIOUS EMBODIMENTS

Various embodiments of the present invention are described, by way of example only, with reference to the drawings, in which identical or related structures, elements, or parts may be labeled with the same reference numerals throughout the figures. Dimensions of components and features shown in the figures are generally chosen for convenience and clarity of presentation and are not necessarily to scale.

Figure 1:
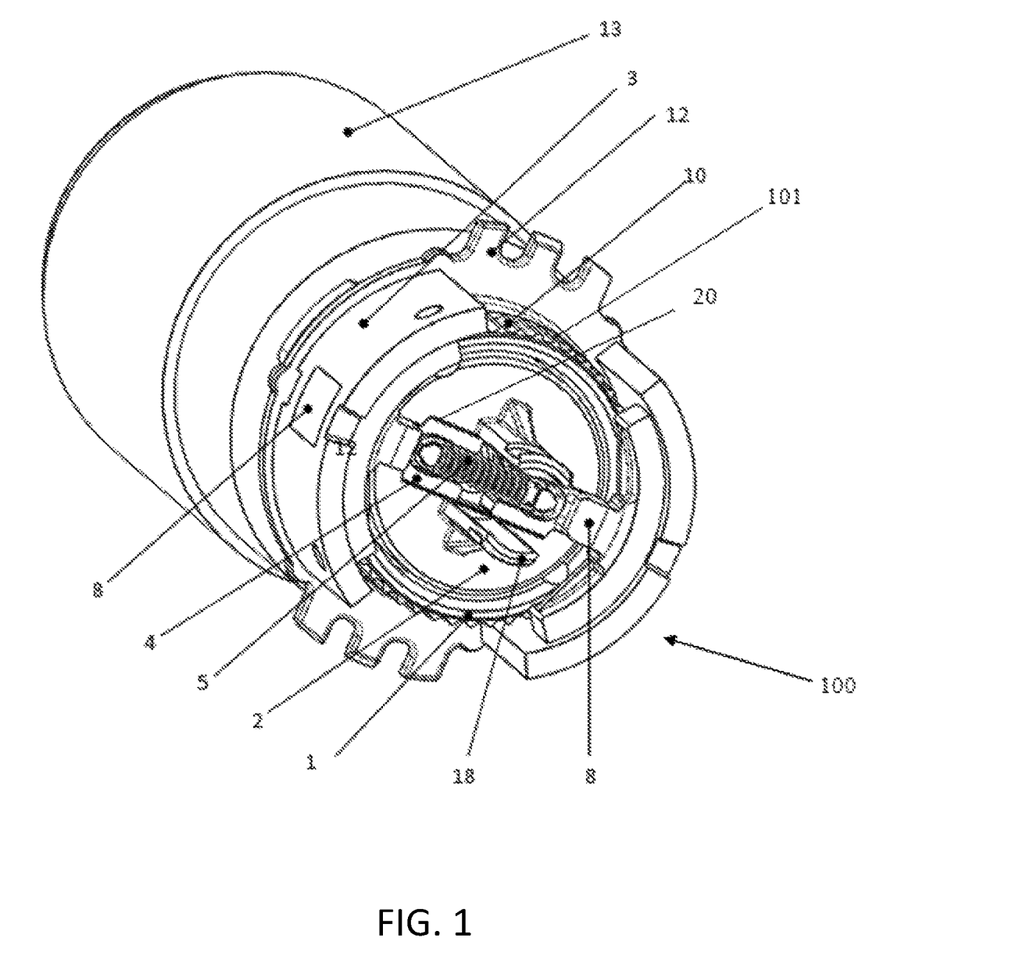
FIG. 1 shows an oblique 3D view of the centrifugal positive blocking brake.

FIG. 1 shows the construction of a centrifugal positive blocking brake 100 in an oblique 3D view. A turntable 2 is coupled with a drive shaft 7 of a drive motor 6 and a groove-like recess 20 is formed in the turntable 2. A central spring element 4 with a preloaded spring 5 disposed inside is centrifugally guided in this groove-like recess of the turntable 2. The central spring element 4 consists of the spring 5 and two embracing spring forks 17, in which the spring 5 is fastened. The spring 5 is radially guided by means of two opposite embracing spring forks 17 which are movably guided. The spring forks 17 together with the spring 5 which is attached in a preloaded manner to their insides form the radially movable central spring element 4. Each of the two spring forks 17 ends in a shank 171 of less width than the widths of the spring forks 17. This shank 171 is supported and guided in a narrower recess of the turntable 2. The width of the spring fork tapers by means of slanted surfaces to form a kind of wedge-shaped shoulder 172. This wedge-shaped shoulder 172 abuts against likewise wedge-shaped surfaces in the turntable 2. In the narrower recess of the turntable 2, the ends of the shanks 171 are coupled with the engaging tab elements 8. These are supported and guided radially movably in the narrower recess. The engaging tab element 8 is coupled with the centrifugal block 3. The detent disc 1 with its detents 10 of a specific radius disposed and incorporated in it is fixedly connected with the frame 12. The stator of the drive motor 6 is also fastened within the frame 12, as can be seen from FIG. 4. Disposed in its centre, the turntable 2 has a drive shaft extension 18, at which further components such as an encoder may be disposed. Likewise, the tubular housing of the tubular motor can be seen.

In one embodiment, a centrifugal block 3 is fastened to each of the engaging tab elements 8 and may be configured as a one-piece centrifugal block or as consisting of two centrifugal block parts 11. The engaging tab element 8 has at least one engaging tab 9 pointing radially inwards. For example, with two engaging tabs 9 per engaging tab element 8, these are symmetrically distributed. In a preferred embodiment of the centrifugal positive blocking brake 100 for shutter drives, only one engaging tab 9 is formed per engaging tab element 8. This allows a very fast start, reducing the minimum motor power of the shutter drive motor to be employed.

Figure 2:
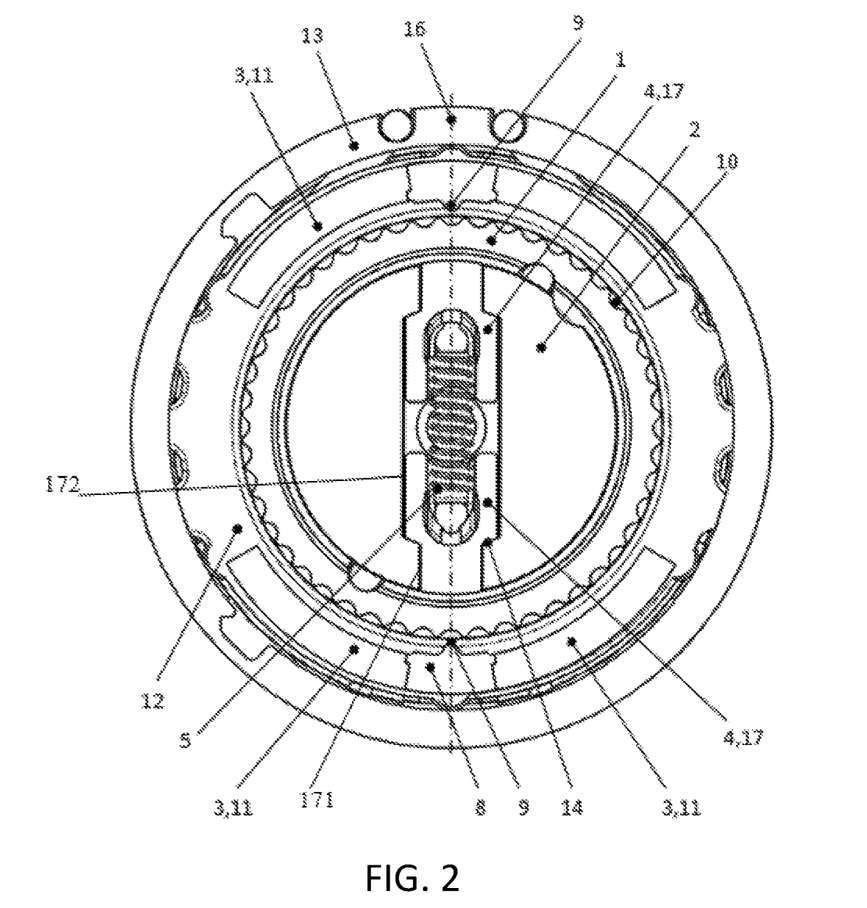
FIG. 2 shows a sectional front view of the centrifugal positive blocking brake in open position.

FIG. 2 shows a sectional front view of the centrifugal positive blocking brake in open position. The two symmetrically opposite engaging tabs 9 of the engaging tab elements 8 with the centrifugal blocks 3 or the centrifugal block parts 11 attached to them are disengaged due to the rotary movement of the energized drive motor and the acting centrifugal forces. That is, the centrically disposed preloaded spring 5 of the central spring element 4 is elongated. The two spring forks 17 have moved so far outwards that the two wedge-shaped shoulders 172 forming the abutment 14 press against the slanted surfaces of the turntable 2, holding all movable parts centred. Radially outwards, the spring forks 17 are preferably wedge-shaped and a wedge surface. The wedge surface serve as an abutment 14, acting as a radial centring stop in connection with equally wedge-shaped surfaces formed in the turntable 2 towards the outer edge. Theses surfaces run towards each other to cause self-centring and fixing. An abutment 15 formed in axial direction of the spring forks 17 serves as an end abutment, also limiting the outward radial movement of all radially movable parts during operation of the drive motor. This prevents unwanted vibration of the radially movable parts of the centrifugal positive blocking brake 100. This abutment also serves as an end abutment for all parts. In this open position, the engaging tab 9 is not engaged into the detents 10 of the detent disc 1. At the same time, due to the centrifugal forces and the centrifugal blocks 3 being fixed by the engaging tab element 9 by means of the abutment 14, no rotating parts can collide with the tangentially sinusoidal curvatures between the individual detents 10. The centrifugal positive blocking brake 100 is enclosed in a protective sleeve 13 which is connected with the housing. Coupled to the spring forks 17 on either side, i.e. to the spring ends of spring 5, is a radially movable engaging tab element 8, with these engaging tab elements 8 being guided in the outer area in a groove-like narrower recess of the turntable 2. If needed, the spring forks 17 may also be integrally formed with engaging tab elements 8. The centrifugal blocks 3 and the connected engaging tab element 8 can also be configured as a single component.

In the centrifugal positive blocking brake 100 for shutter drives, the transitions between the individual detents 10 of the detent disc 1 are tangentially sinusoidal.

Figure 3:
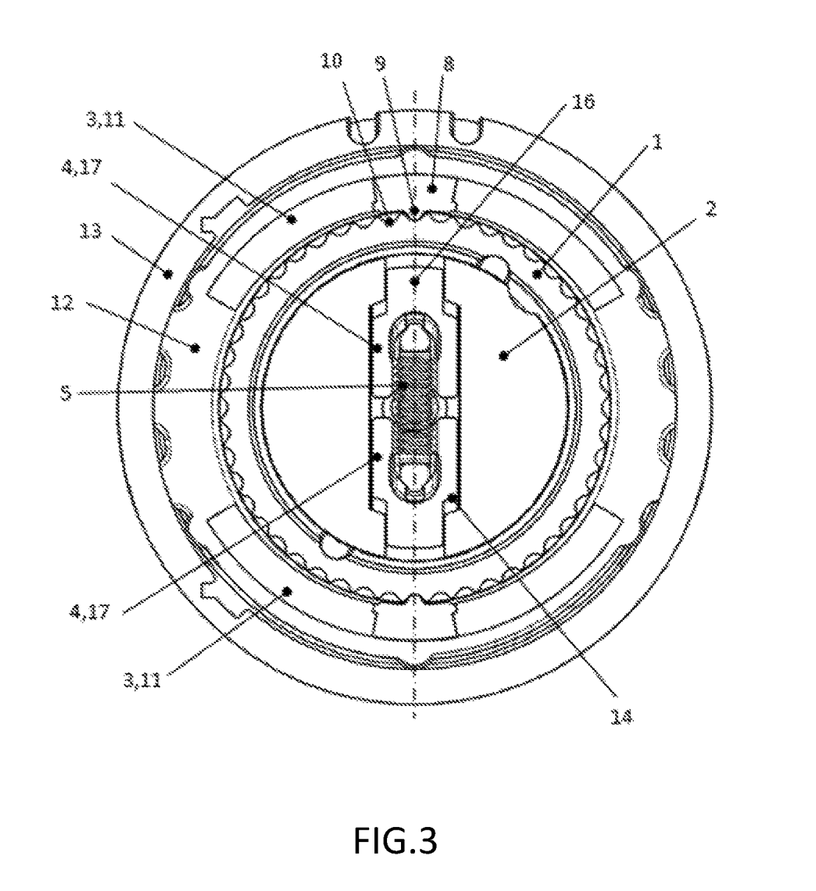
FIG. 3 shows a sectional front view of the centrifugal positive blocking brake in closed position.

FIG. 3 shows a sectional front view of the centrifugal positive blocking brake in closed position, i.e. the two engaging tabs 9 each engage into one detent 10 of the detent disc 1 when the drive motor 6 is in the de-energized state. In one embodiment, the radius of the engaging tab 9 is preferably in the ratio of ⅘ to ½ of the radius of the detent 10. In a preferred embodiment, the radius of the engaging tab 9 is preferably in the ratio of ⅔ of the radius of the detent 10. Due to the preload, the spring 5 causes all radially movable parts such as centrifugal blocks 3 or centrifugal block parts 11, the two engaging tab elements 8 with the inwardly pointing engaging tabs 9 and also the two spring forks 17 of the central spring element 4 to be pulled radially inwards. The wedge-shaped abutment 14 is not engaged, and now a defined distance exists between the wedge-shaped surfaces of the recess of the turntable 2 and the wedge-shaped shoulders 172 of the spring forks 17. All radially movable parts are dimensioned and matched in mass with respect to each other so that the centres of mass of all rotatably movable part are located exactly on the symmetry axis 16. The radius of the curved centrifugal blocks 3 or centrifugal block parts 11 is somewhat larger than the outer radius of the detent disc 1 so that there is no contact of the centrifugal blocks 3 or centrifugal block parts 11 with the detent disc 1. The number of detents 10 is identical or they are an integer multiple of the detent positions of the drive motor 11. This is required to avoid unnecessary noise and each engaging tab 9 can always engage into exactly one detent 10. If the engaging tabs 9 are disengaged when voltage is applied and the drive motor 6 starts, all movable parts must be able to move freely within tight tolerance limits and without friction. For this effect to occur in this perfectly coordinated centrifugal positive blocking braking system without impairment and unnecessary wear over a prolonged period, the individual centres of mass of all radially movable parts (such as central spring element 4, spring 5, engaging tab element 8, engaging tab 9 and centrifugal blocks 3 or centrifugal block parts 11) are provided to be on one symmetry axis 16. This centrifugal positive blocking brake 100 is designed to be extremely small in size, constructively very simple and low-noise and is characterized by a long service life. When the drive motor is de-energized, it ensures a permanent, fast locking of the shutter and causes the centrifugal positive blocking brake to release fast when the drive is energized. It operates reliably in a passive manner and even without requiring any auxiliary energy to be additionally provided, while offering minimized power consumption of the drive motor 6.

Figure 4:
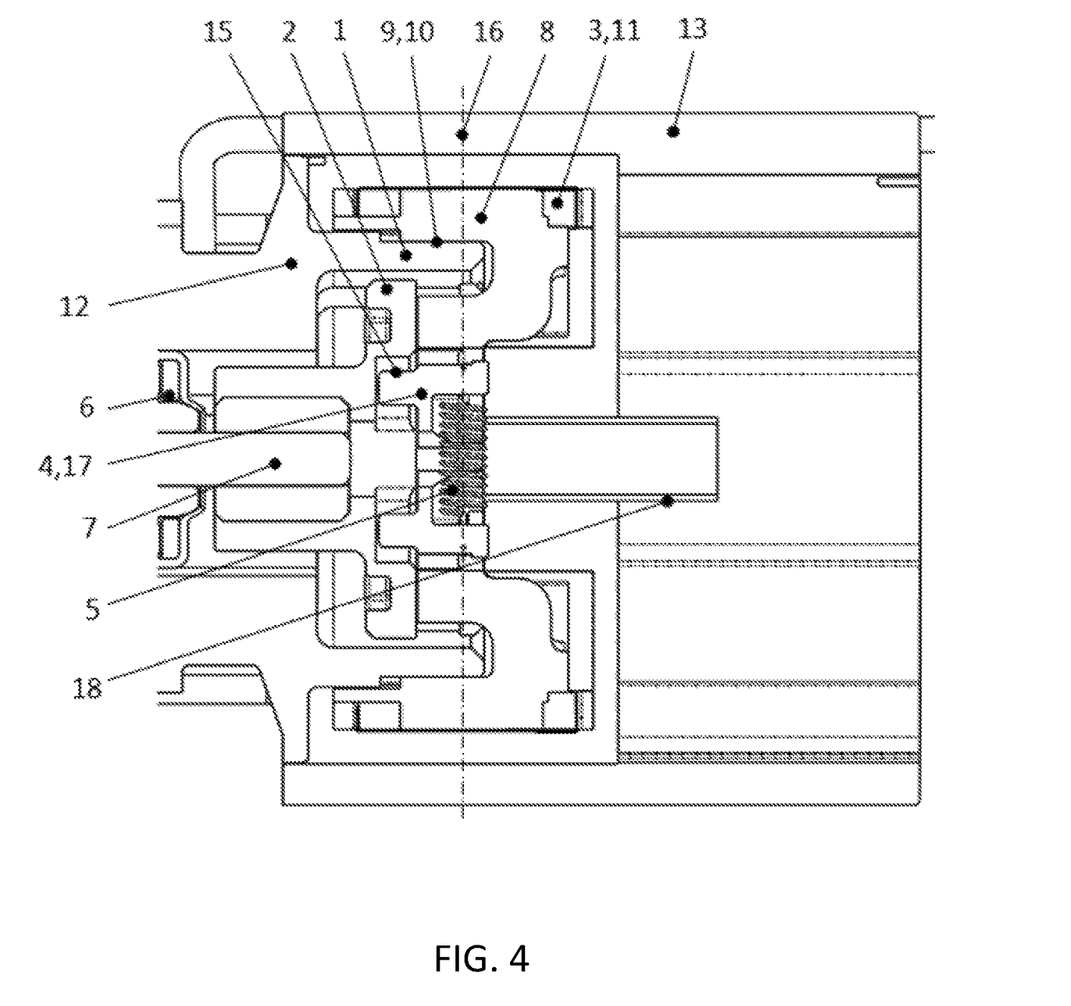
FIG. 4 shows a sectional side view of the centrifugal positive blocking brake in closed position.

FIG. 4 shows a sectional side view of the centrifugal positive blocking brake in closed position. Inside the frame 12 the stator of the drive motor 6 is firmly connected with the outside of the detent disc 1. The rotor is seated on the drive shaft 7, on which the turntable 2 is press-fitted. The detent disc 1 is overarched by the engaging tab element 8 to which the centrifugal blocks 3 or the centrifugal block parts 11 are firmly connected. The engaging tab 9 engages into a detent 10. All radially movable parts such as the two centrifugal blocks 3, the engaging tab elements 8 with the engaging tabs 9, the central spring element 4 consisting of the two spring forks 17 with the preloaded spring 5 disposed inside and the further abutments 15 disposed on the spring forks are dimensioned and matched in mass with respect to each other so that the centres of mass of all rotatably movable parts are located exactly on the symmetry axis 16. The pin-like abutments 15 engage in a further small groove-like recess of the turntable 2, acting as a third end abutment for the outward radial movement of the parts. This prevents canting of movable parts during motor operation.

Figure 5:
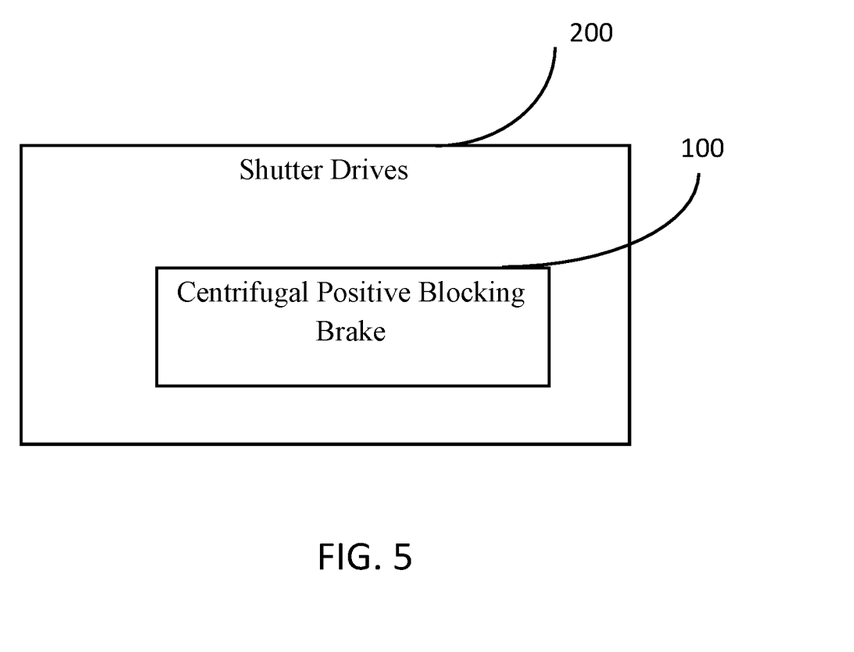
FIG. 5 shows a module diagram of shutter drives including a centrifugal positive blocking brake of FIG. 1.

FIG. 5 shows a module diagram of a shutter drive including a centrifugal positive blocking brake of FIG. 1. The shutter drive 200 includes the centrifugal positive blocking brake 100. The centrifugal positive blocking brake 100 is configured to keep a shutter in current position when the drive motor 6 is powered off.

This previously described technical solution can be used primarily for lead-throughs of actuator-operated operating rods for valve units for regulating the most varied of fluid flows.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A centrifugal positive blocking brake for shutter drives, comprising centrifugal blocks, at least one central spring element, a drive motor disposed in a tubular housing and comprising a drive shaft;
   wherein a turntable is coupled with the drive shaft of the drive motor,
   the central spring element having a preloaded spring disposed inside is centrifugally guided in a recess of the turntable,
   either side of the spring is connected with a radially movable engaging tab element which is guided in the turntable,
   two different radial acting abutments are disposed on the central spring element and are movable towards recess in the turntable,
   the engaging tab element has at least one engaging tab pointing radially inwards,
   the centrifugal block is attached to the engaging tab element, in the de-energized state of the drive motor, the engaging tab elements together with the centrifugal blocks disposed on them engage into detents of a frame-fixed detent disc with at least one engaging tab in a frictionally and positively locking manner,
   when voltage is applied and the drive motor starts, the engaging tabs disengage, the individual centres of mass of the central spring element, preloaded spring, the engaging tab element, the engaging tab, and two centrifugal block parts are on one symmetry axis.

2. The centrifugal positive blocking brake for shutter drives according to claim 1, wherein only one engaging tab is formed per engaging tab element.

3. The centrifugal positive blocking brake for shutter drives according to claim 2, wherein the engaging tab is in precise centrical alignment with the symmetry axis and with the spring element on the engaging tab element.

4. The centrifugal positive blocking brake for shutter drives according to claim 1, wherein the transitions between the individual detents are tangentially sinusoidal.

5. The centrifugal positive blocking brake for shutter drives according to claim 1, wherein the abutment in the turntable is wedge-shaped.

6. The centrifugal positive blocking brake for shutter drives according to claim 2, wherein the radius of the engaging tab is in the ratio of ⅘ to ½ of the radius of the detent.

7. The centrifugal positive blocking brake for shutter drives according to claim 6, wherein the radius of the engaging tab is in the ratio of ⅔ of the radius of the detent.

8. The centrifugal positive blocking brake for shutter drives according to claim 1, wherein the number of detents is identical with or an integer multiple of the detent positions of the drive motor.

9. The centrifugal positive blocking brake for shutter drives according to claim 1, wherein the centrifugal block is formed as a single part or as two centrifugal block parts.

10. The centrifugal positive blocking brake for shutter drives according to claim 1, wherein the central spring element further comprises two embracing spring forks, in which the spring is fastened.

11. The centrifugal positive blocking brake for shutter drives according to claim 10, wherein the spring forks are wedge-shaped.

12. The centrifugal positive blocking brake for shutter drives according to claim 11, wherein the abutment is formed on a wedge surface of the spring forks.

13. The centrifugal positive blocking brake for shutter drives according to claim 11, wherein the abutment is formed in an axial direction of the spring forks.

14. The centrifugal positive blocking brake for shutter drives according to claim 1, wherein the centrifugal blocks and the engaging tab element are formed as a single part.

15. A shutter drive comprising a centrifugal position blocking brake, wherein the centrifugal positive blocking brake comprises centrifugal blocks, at least one central spring element, a drive motor disposed in a tubular housing and comprising a drive shaft;
   a turntable is coupled with the drive shaft of the drive motor,
   the central spring element having a preloaded spring disposed inside is centrifugally guided in a recess of the turntable,
   either side of the spring is connected with a radially movable engaging tab element which is guided in the turntable,
   two different radial acting abutments are disposed on the central spring element and are movable towards recess in the turntable,
   the engaging tab element has at least one engaging tab pointing radially inwards,
   the centrifugal block is attached to the engaging tab element,
   in the de-energized state of the drive motor, the engaging tab elements together with the centrifugal blocks disposed on them engage into detents of a frame-fixed detent disc with at least one engaging tab in a frictionally and positively locking manner,
   when voltage is applied and the drive motor starts, the engaging tabs disengage, the individual centres of mass of the central spring element, preloaded spring, the engaging tab element, the engaging tab, and two centrifugal block parts are on one symmetry axis.

* * * * *